United States Patent [19]
Terry et al.
[11] 3,764,783
[45] Oct. 9, 1973

[54] DELAY-INTERVAL SELECTION FOR A DIGITAL DELAY GENERATOR

[75] Inventors: Frank D. Terry; Charles H. House, both of Colorado Springs; Virgil C. West, Longmont, all of Colo.

[73] Assignee: Hewlett-Packard Company, Palo Alto, Calif.

[22] Filed: Oct. 12, 1972

[21] Appl. No.: 297,102

[52] U.S. Cl. ............ 235/92 EV, 235/92 PE, 328/48
[51] Int. Cl. ....................... H03k 21/00, H03k 21/36
[58] Field of Search .................... 235/92 EV, 92 PE; 328/44, 48; 307/222 R

[56] References Cited
UNITED STATES PATENTS

| | | | |
|---|---|---|---|
| 3,665,323 | 5/1971 | Peterson | 235/92 EV |
| 3,510,633 | 5/1970 | Kintner | 235/92 EV |
| 3,534,398 | 10/1970 | Wajda | 235/92 CT |

*Primary Examiner*—Maynard R. Wilbur
*Assistant Examiner*—Joseph M. Thesz, Jr.
*Attorney*—Patrick J. Barrett

[57] ABSTRACT

An up/down counter is interconnected with a clock using a double-throw momentary contact switch to form a one decade interval select control. When the switch is moved to the "increment" position, the decade counter increments at a rate determined by pulses supplied by a low frequency oscillator. When the switch is moved to the "decrement" position, the decade counter decrements at the same rate. A plurality of up/down decade counter-switch combinations can be interconnected to form multi-decade interval select controls. In this configuration, when any particular counter increments or decrements through a decade, a signal is sent to the next higher counter, which then increments or decrements appropriately.

2 Claims, 2 Drawing Figures

DELAY-INTERVAL SELECTION FOR A DIGITAL DELAY GENERATOR

BACKGROUND AND SUMMARY OF THE INVENTION

In some electronic test instruments, it is desirable to delay the start of an electronic signal for a given time interval, the interval being adjustable by the operator of the equipment. For example, to scan a pulse train the sweep signal of an oscilloscope must be delayed from a reference point in the pulse train by an increasingly longer time interval for each successive sweep. A conventional method of accomplishing this is to use a sequence of coded "thumbwheel" switches to adjust the delay. Each thumbwheel switch can be manually rotated to select codes 0 through 9, thereby determining the value of one decade of the delay interval. By setting each decade separately to the desired digit, any desired delay interval can be established. Once an initial delay is established, the delay can be incremented by advancing the appropriate thumbwheel switch. The thumbwheel switches are often ganged together so a transition between decades in the delay interval is indicated in the next higher decade, e.g., if a decade in the delay interval is incremented from "9" to "0," the decade adjacent on the left is geared to increment one digit to provide the "carry."

Other conventional methods for providing a sequentially adjustable delay include odometers and dials. These can be made to increment faster than thumbwheel counters, but they cannot be quickly preset to an initial address because only the lowest decade is directly controllable, i.e., to advance the tens decade, the units decade must be incremented to "0" causing a "carry" to advance the tens decade.

These conventional methods are all subject to several limitations. They tend to be slow and bulky. They do not permit convenient selection of large delays coupled with the ability to scan (increment and decrement). Most important, they are mechanical and thus do not permit electronic remote programming of delay interval as well as direct control.

The present invention, referred to herein as an interval-select control, includes a number of electronic up/-down decade counters interconnected with a number of doublepole, double-throw momentary-contact switches. Each of the switches has an "off" position, an "increment" position, and a "decrement" position. When any switch is in the "increment" or "decrement" position, a voltage that permits the counters to increment (count upwards) or decrement (count downwards) is applied to a "count direction" terminal of every counter. Simultaneously, clock pulses from a low frequency oscillator are applied to a "clock pulse" terminal of the decade counter corresponding to the activated switch. That counter will then increment or decrement at a rate determined by the frequency of the clock pulses. However, since the increment or decrement pulse was sent to every counter, the next higher decade counter is also enabled to count if a decade transition or "carry" occurs. Such a "carry" occurs if a particular counter passes from nine to zero or from zero to nine. A "tens carry" output pulse from that counter is then sent to the clock pulse input of the next higher decade counter, which responds by incrementing or decrementing appropriately.

Since this invention utilizes electronic decade counters, it is more compatible with electronic digital circuits than thumbwheel counters or odometers. In addition, this invention combines the incrementing ability of odometers and the quick-access presetting feature of a rotary thumbwheel counter.

DESCRIPTION OF THE PREFERRED EMBODIMENT

Figure 1:
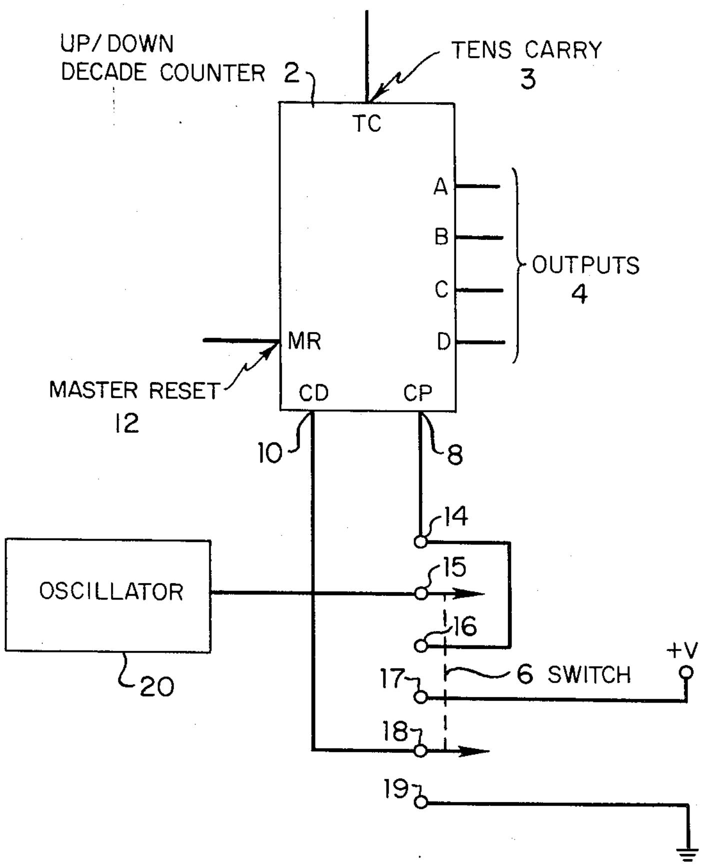
FIG. 1 is a schematic diagram of a preferred embodiment of a one decade interval-select control.

Referring to FIG. 1, an up/down decade counter 2, similar to the Fairchild 9306 counter shown on pages 3–38 in the Fairchild Semiconductor Integrated Circuit Data Catalog (1970), has four outputs 4 that indicate the digit stored by the counter in binary coded decimal form. A double-pole double-throw switch 6, having two moving contacts 15 and 18 and four stationary contacts 14, 16, 17, 19 is connected to counter 2. Stationary contacts 14 and 16 are connected together and to a "clock pulse" terminal 8 of the counter. Moving contact 15 is connected to an oscillator 20 to provide clock pulses to drive counter 2.

Moving contact 18 is connected to a "count direction" terminal 10 of the counter. Stationary contacts 17 and 19 are respectively connected to voltages that allow counter 2 to count in an upwards or a downwards direction in response to applied clock pulses.

The up/down decade counter counts at a rate determined by the pulses applied to terminal 8. The direction of counting depends on the logic level of the voltage on terminal 10. When the switch is moved to the upwards position, so that contact 18 touches contact 17, a positive voltage is applied to the count direction terminal. Because the two moving contacts 15 and 18 are ganged together, contact 15 simultaneously makes contact with contact 14. This applies clock pulses to clock pulse terminal 8.

As long as the switch is in this position, the decade counter counts in an upwards direction. When the switch is returned to the center position, the counter no longer counts. If the switch is moved to a lower position, so contacts 18 and 19 touch and contacts 15 and 16 touch, the decade counter counts in a downwards direction.

A "tens carry" terminal 3 is an output terminal that transmits a pulse whenever the counter increments from "9" to "0" or decrements from "0" to "9." When a signal is applied to a "master reset" terminal 12, the counter is set to "0."

By interconnecting more decade counters and more switches to provide additional decades, a multi-decade interval-select control can be constructed. Such an interval-select control can be quickly preset to any desired value, and it can be incremented or decremented by any decade at a rate determined by the oscillator.

Figure 2:
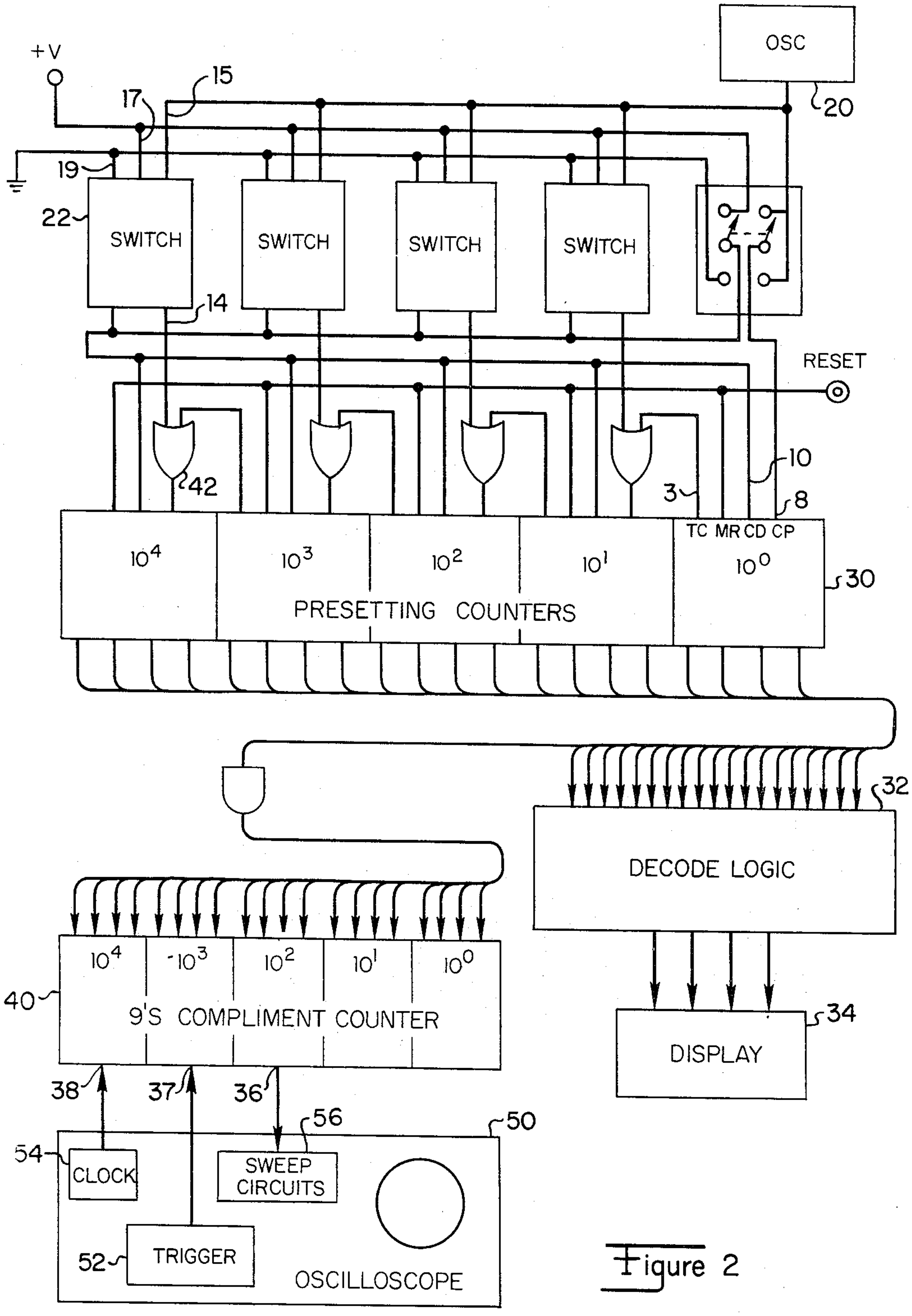
FIG. 2 is a schematic diagram of a sweep delay circuit that utilizes a five decade interval-select control.

FIG. 2 shows the use of such a multi-decade interval-select control to regulate the delay interval before the start of a sweep signal in an oscilloscope 50. Five double-pole double-throw switches 22 are used to control five up/down decade counters 30. The switches may be rocker-arm up-down switches having three positions: "off" in the middle and momentary "on" in opposite directions. When a switch is held "on" in the up position, the decade counter corresponding to that switch increments automatically at the rate of the clock pulses supplied by the low frequency oscillator 20. Similarly, the counter decrements as long as the switch is held down. For the circuit shown in FIG. 2, the oscillator is adjusted to provide clock pulses at a frequency of about 3 Hz. Thus counting occurs at a 3 Hz rate. Although this rate was chosen to combine operator convenience and counting speed, other rates can be used if desired.

The count direction outputs 18 from the switches are connected in common to the count direction terminals 10 of each of the counters. Consequently, when any switch is turned on, its count direction output voltage is connected to all of the counters in parallel. However, only those counters simultaneously receiving pulses at their clock pulse terminals will count. Such pulses may originate at the oscillator 20 and be directed to the counter by the corresponding switch, or the pulses may come from the "tens carry" output 3 of the counter representing the next lower decade. In the embodiment shown in FIG. 2, these alternate clock pulse sources are connected at the input of an "OR" gate 42, which sends an output pulse to the clock pulse input gate 8 of the counter whenever either source is supplying a pulse. Thus, a particular counter will count in response to a signal from its corresponding switch, and will also count when it receives a tens carry pulse indicating that the counter representing the next lower decade has incremented from nine to zero.

The value set into the counters 30 is transmitted to decoding logic 32 that drives an electro-optical display 34. The value in the control is displayed on the display 34. The value is also preset into a 9's complement counter 40, similar to the Fairchild 9310 shown on pages 3–57 in the Fairchild Semiconductor Integrated Circuit Data Catalog (1970), that acts as the oscilloscope sweep delay. When a pulse enters a gate pulse terminal 37 from a trigger circuit 52, counter 40 begins counting the pulses applied to a clock pulse terminal 38 by a clock 54. When the 9's complement counter counts a number of clock pulses equal to the number preset from counters 30, it transmits a start signal from a sweep start terminal 36 to a sweep circuit 56. This signal starts the oscilloscope sweep. Thus, an operator can preset the sweep delay by using the switches 22 to establish the desired interval into the counters 30. He can also quickly increment or decrement the sweep delay from the initial setting by holding "on" the proper switch. In this manner, the sweep signal of an oscilloscope can be controlled to display successive pulses in a pulse train.

Clock 54 may be a standard crystal controlled oscillator; oscillator 20 may also be a crystal controlled oscillator with a divider on the output. Trigger circuit 52 and sweep circuit 56 are standard oscilloscope circuits.

We claim:

1. In an oscilloscope, a digital delay device including a digital delay register for storing a value representing a preselected delay interval, clock means for generating counting pulses at a preselected frequency, counting means for counting the pulses from said clock means up to a number of pulses determined by the value stored in the digital delay register, and for generating an output pulse when said number of pulses has been counted, and a start delay control for sending a start count signal to said counting means; the improvement comprising:

a plurality of up/down decade counters, each having a count direction input, a clock pulse input, a plurality of digit outputs, and a tens carry output, the tens carry output of each counter being connected with the clock pulse input of an adjacent counter;

a voltage source for supplying increment and decrement voltages to said up/down decade counters;

an increment/decrement clock pulse source for supplying pulses to be counted by said up/down decade counters;

a plurality of switches, each connected to a corresponding up/down decade counter, each switch having three positions, an increment position for connecting the increment/decrement clock pulse source to the clock input of a corresponding decade counter and an increment voltage from the voltage source to the count direction input of a plurality of decade counters, a decrement position for connecting the clock pulse source to the clock input of said corresponding decade counter and a decrement voltage from the voltage source to the count direction input of a plurality of decade counters, and a third position for making no connections.

2. A digital delay device as in claim 1 including a numeric display connected to the digit outputs of the up/down counters for displaying a number stored therein.

* * * * *